3,162,656
6-DEHYDRO-17α-ETHYNYL-ESTROGENS
Howard J. Ringold and George Rosenkranz, Mexico City, Mexico, assignors, by mesne assignments, to Syntex Corporation, a corporation of Panama
No Drawing. Filed Aug. 23, 1960, Ser. No. 51,257
Claims priority, application Mexico, July 10, 1956, 45,202, 45,203
2 Claims. (Cl. 260—397.5)

The present invention relates to cyclopentanophenanthrene compounds and to a method for the production thereof.

More particularly the present invention relates to novel 4-methyl and 1,4-dimethyl estrone and estradiol derivatives and to a novel process for the production thereof. The novel compounds of the present invention are estrogenic hormones which show weak estrogenic activity together with anti-androgenic activity.

The novel compounds of the present invention are illustrated by the following formulas:

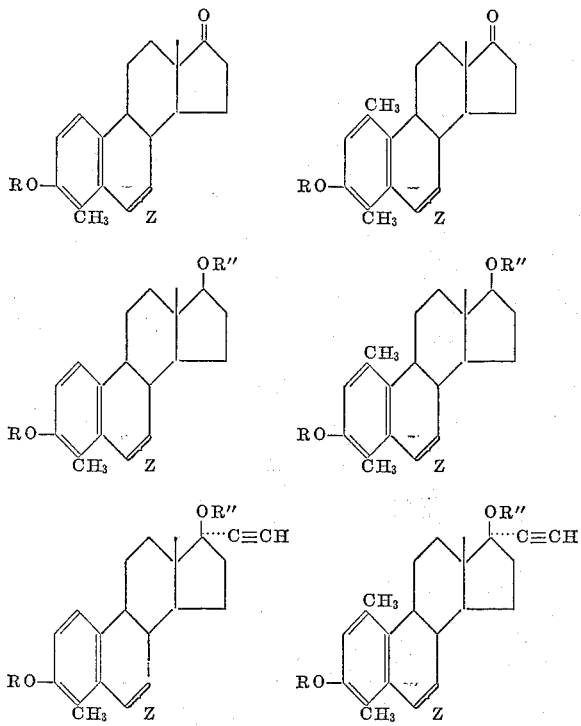

In the above formulas, Z indicates a double bond or a saturated linkage between C-6 and C-7 and R and R″ represent hydrogen or an acyl group derived from a hydrocarbon carboxylic acid of less than 12 carbon atoms, saturated or unsaturated, of straight, branched, cyclic or cyclic-aliphatic chain or aromatic. Typical examples of such ester groups are the acetate, propionate, butyrate, caproate, benzoate, cyclopentylpropionate and phenylpropionate.

In our U.S. Patent 2,844,602, there is disclosed the production of the novel 4-methyl testosterone. In accordance with the present invention it has been discovered that this compound upon treatment with an oxidizing agent capable of oxidizing the 17-hydroxyl group to a keto group yields the novel intermediate and androgenic hormone 4-methyl-Δ⁴-androsten-3,17-dione. Further this last compound upon treatment with approximately 2 mols of bromine gives the novel intermediate 4-methyl-2,6-dibromo-Δ⁴-androsten-3,17-dione which yields the novel 4-$\Delta^{1,4,6}$-androstatriene-3,17-dione upon treatment with a dehydrohalogenating agent. Upon rearrangement and conventional saponification, this last compound gives the novel estrogenic hormones and key intermediates, i.e., the lower fatty acid esters of, and 1,4-dimethyl-6-dehydroestrone.

From this last compound there may be made other novel 1,4-dimethyl estrone and estradiol derivatives such as 1,4-dimethyl-6-dehydro-estradiol, 1,4-dimethyl-17α-ethinyl-6-dehydro-estradiol, 1,4-dimethyl-estrone, 1,4-dimethyl-estradiol and 1,4-dimethyl-17α-ethinyl-estradiol. From these compounds by conventional means, there are also prepared their novel esters of hydrocarbon carboxylic acids of less than 12 carbon atoms.

Alternatively, upon pyrolizing the 4-methyl-$\Delta^{1,4,6}$-androstatriene-3,17-dione, aromatization results and there is formed 4-methyl-5-dehydro-estrone, an estrogenic hormone and intermediate for the production of other novel estrogenic hormones namely 4-methyl-estrone, 4-methyl-estradiol, 4-methyl-17α-ethinyl-estradiol, 4-methyl-6-dehydro-estradiol, and 4-methyl-17α-ethinyl-6-dehydro-estradiol. From these compounds by conventional means there are also prepared their novel esters of hydrocarbon carboxylic acids of less than 12 carbon atoms.

A part of the process of the present invention may be exemplified by the following equation:

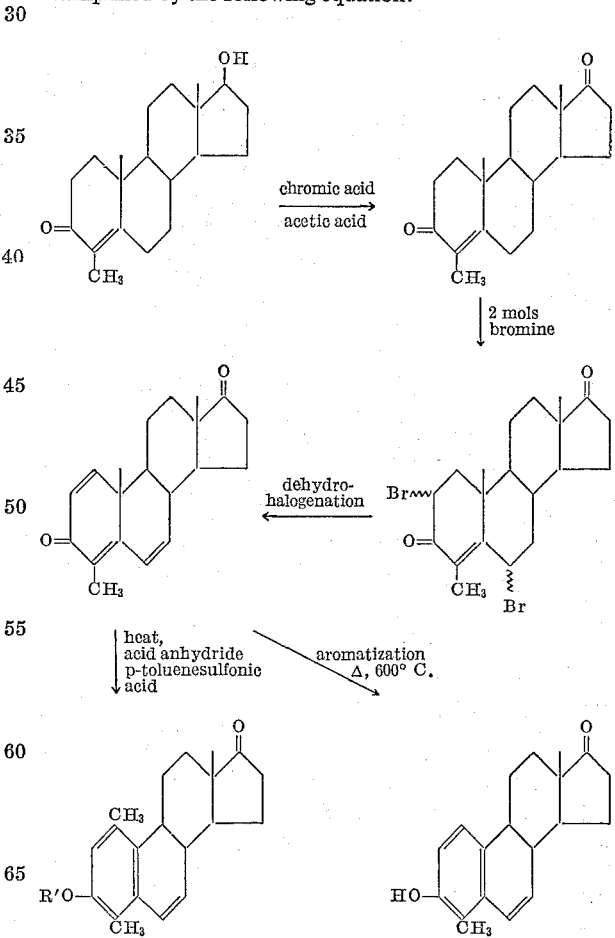

In the above equation R' represents a lower fatty acyl group, either acetate or propionate depending on the particular acid anhydride of the last step indicated or, upon conventional saponification, hydrogen.

In practicing the process above outlined the 4-methyl testosterone (4-methyl-Δ⁴-androsten - 17β - ol - 3 - one) is preferably dissolved in glacial acetic acid and the solution cooled below temperature. Chromic acid (slightly over 1 equivalent) in acetic acid is then added slowly with stirring while maintaining the reaction mixture below room temperature. The reaction mixture is then allowed to stand for a period of the order of 2 hours at room temperature, poured into ice water and the precipitate of 4-methyl-Δ⁴-androstene-3,17-dione is collected and purified as by crystallization from an alcoholic solvent. This product is then suspended in an organic solvent such as ether to which a catalytic amount of hydrogen bromide in acetic acid is added. To this suspension there is slowly added slightly over 2 mols of bromine in acetic acid. The resulting clear solution is then allowed to stand for one hour and then concentrated under reduced pressure until crystallization of the 2,6-dibromo-4-methyl-Δ⁴-androstene-3,17-dione. The crystals are then filtered and washed with a small amount of ether and consisted of a mixture of both the 6α and 6β bromo isomers.

As indicated in the equation the 2,6-dibromo compound upon treatment with a dehydrohalogenating agent gives as a product 4-methyl-Δ$^{1,4,6}$-androstatriene-3,17-dione. As a suitable dehydrohalogenating agent a tertiary amine such as collidine under reflux is used. Preferably the dibromo compound is refluxed with the collidine for a short period of the order of 1 hour and then cooled. The product is separated from the collidine hydrobromide and purified to give 4-methyl-Δ$^{1,4,6}$-androstatriene-3,17-dione. This product upon treatment with a lower fatty acid anhydride, such as acetic or propionic and p-toluenesulfonic acid, as by heating on a steam bath for a few hours, rearranges to form the corresponding 3-lower fatty acid ester of 1,4-dimethyl-6-dehydro-estrone. Conventional saponification of these compounds as with methanolic alkali metal hydroxide or with an acid gives the free 1,4-dimethyl-6-dehydro-estrone. From the free compound by conventional acylation procedures such as reaction with corresponding acid anhydrides or acyl halides there are then prepared other esters especially those of hydrocarbon carboxylic acids of less than 12 carbon atoms such as those previously set forth.

The formation of the 4-methyl-6-dehydro estrone is achieved by passing a dilute solution, as for example 1-2% by weight of the 4-methyl-Δ$^{1,4,6}$-androstatriene-3,17-dione, through a tube or column filled with glass helices heated to a temperature as for example of 600° C. and preferably between 500° and 650° C. The solvents used are preferably hydrogen donor solvents such as tetralin, mineral oil, dihydronaphthalene, dihydrophenanthrene, cyclohexene, etc. After passage through the tube the hot solution is diluted with an organic solvent such as hexane and the product (4-methyl-6-dehydro-estrone) purified as by chomatography and crystallization. From the free compound by conventional acylation procedures such as reaction with the corresponding acid anhydrides or acyl halides there are then prepared esters of hydrocarbon carboxylic acids of less than 12 carbon atoms such as those previously set forth.

In accordance with the following equation, the 1,4-dimethyl-6-dehydro-estrone and 4-methyl-6-dehydro-estrone are useful as intermediates for the preparation of the corresponding 6-dehydro-estradiols and 17α-ethinyl-6-dehydro-estradiols.

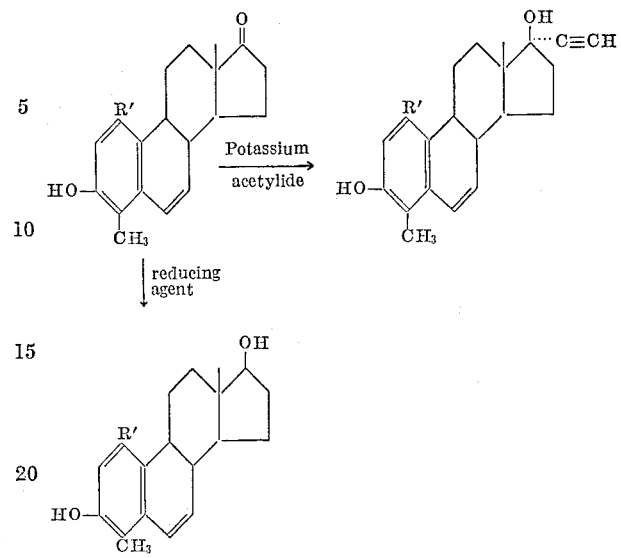

In the above equation, R' represents hydrogen or methyl.

To prepare the ethinyl estradiol derivatives as indicated above, the 17-keto compound is reacted with potassium acetylide prepared in situ. Thus the 1,4-dimethyl-6-dehydro-estrone or 4-methyl-6-dehydro estrone may be dissolved in an organic solvent, such as benzene, and added to a solution of potassium metal in a tertiary alcohol such as t-butyl alcohol. Acetylene is then passed into the reaction mixture for a prolonged period of time of the order of 2 days. Neutralization with acid and removal of the organic solvents by steam distillation resulted in a precipitate of the product which was then purified as by crystallization.

For the production of the estradiol derivative the estrone compound is treated with a reducing agent preferably an alkali metal hydride such as sodium borohydride in alcohol-water solution or lithium aluminum hydride in ether or tetrahydrofuran solution.

Similarly with prior hydrogenation the intermediate 1,4-dimethyl-6-dehydro-estrone or 4-methyl - 6 - dehydro-estrone can be utilized for the preparation of 1,4-dimethyl-estrone, 1,4-dimethyl-estradiol, 1,4-dimethyl-17α-ethinyl-estradiol, 4-methyl-estrone, 4-methyl-estradiol and 4-methyl-17α-ethinyl-estradiol, in accordance with the following equation:

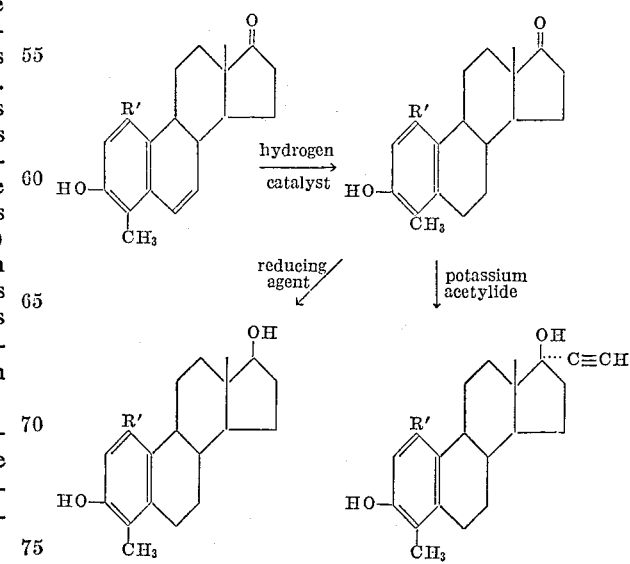

In the above formulas, R' represents hydrogen or methyl.

As indicated above, hydrogenation in the presence of a hydrogenation catalyst preferably palladium or platinum until 1 mol of hydrogen was taken up, gave the corresponding 1,4-dimethyl-estrone or 4-methyl-estrone. Reaction with a reducing agent or with potassium acetylide as previously described in connection with the 6-dehydro compounds gave the corresponding 1,4-dimethyl estradiol, 4-methyl-estradiol, 17α-ethinyl-1,4-dimethyl-estradiol and 17α-ethinyl-4-methyl estradiol derivatives.

It may be noted further that all of the non-tertiary alcohol groups in both the 6-dehydro and corresponding 6-saturated compounds previously described may be conventionally esterified as with acid anhydride or acyl halides to give either mono or diesters as previously indicated.

By reaction with acid anhydrides in pyridine solution under reflux conditions or by reaction in benzene solution and in the presence of catalytic amounts of p-toluenesulfonic acid, the tertiary hydroxyl group in both the 6-dehydro and 6-saturated compounds is esterified with simultaneous esterification of free secondary hydroxyl groups. Upon mild alkaline hydrolysis of the ester group at C–3 there is thus formed the C–17 monoester. Reesterification of the free hydroxyl group at C–3 with the same or different carboxylic acid anhydrides results in diesters having the same or different ester groups.

This application is a continuation-in-part of our copending applications Serial Nos. 669,953 and 669,954, filed on July 5, 1957, both abandoned.

The following specific examples serve to illustrate but are not intended to limit the present invention:

Example I

A solution of 710 mg. (1.1 equivalents) of chromic acid in 15 cc. of 80% acetic acid was added dropwise to a stirred solution of 3.0 g. of 4-methyl-Δ⁴-androsten-17β-ol-3-one in 30 cc. of glacial acetic acid, while the temperature was maintained below 20° C. After 2 hours standing at room temperature the mixture was poured into ice water and the precipitate was collected, well washed with water and crystallized from methanol, thus giving 4-methyl-Δ⁴-androstene-3,17-dione.

A suspension of 2.5 g. of the above compound in 50 cc. of ether containing 3 drops of a saturated solution of hydrogen bromide in acetic acid, was slowly treated with a solution of 2.8 g. (2.1 mols) of bromine in 30 cc. of acetic acid. The resulting clear solution was kept standing for 1 hour and then concentrated under reduced pressure until crystallization. The 2,6-dibromo-4-methyl-Δ⁴-androstene-3,17-dione produced was filtered and washed with a little ether.

3.0 g. of the 2,6-dibromo derivative was refluxed for 1 hour with 10 cc. of collidine and then cooled. The precipitate of collidine hydrobromide was filtered and well washed with ether and the solution was washed with dilute hydrochloric acid, with sodium bicarbonate and water, dried and evaporated to dryness. Chromatography of the residue with 100 g. of alumina afforded the pure 4-methyl-Δ¹,⁴,⁶-androstatriene-3,17-dione.

A mixture of 1.0 g. of 4-methyl-Δ¹,⁴,⁶-androstatriene-3,17-dione, 40 cc. of acetic anhydride and 300 mg. of p-toluenesulfonic acid was heated on the steam bath under anhydrous conditions for 4 hours. The cooled mixture was poured into 500 cc. of water and kept standing overnight at room temperature. The precipitate was filtered, well washed with water, dried and crystallized from acetone-hexane, thus affording the acetate of 1,4-dimethyl-6-dehydro-estrone.

0.5 g. of the above acetate in 30 cc. of methanol was treated under an atmosphere of nitrogen with 0.2 g. of potassium hydroxide in 2 cc. of water. The mixture was kept for 1 hour at room temperature and then acidified with acetic acid and concentrated to one third of its volume. Dilution with water and filtration of the precipitate yielded the free 1,4-dimethyl-6-dehydro-estrone which was crystallized from acetone-hexane.

Conventional reaction of this compound with acid anhydrides or chlorides gave the corresponding 3-propionate, 3-benzoate, 3-cyclopentylpropionate and the 3-phenylpropionate.

Example II

A solution of 0.3 g. of 1,4-dimethyl-6-dehydroestrone in 20 cc. of methanol was treated with a solution of 0.2 g. of sodium borohydride in 3 cc. of water. After keeping the mixture for 3 hours at room temperature, it was treated with a few drops of acetic acid and diluted with salt water. The precipitate was collected, washed with water and crystallized from acetone-hexane, thus producing 1,4-dimethyl-6-dehydro-estradiol.

Conventional reaction of this compound with acid anhydrides or chlorides gave the corresponding 3,17-dipropionate, 3,17-dibenzoate, 3,17-bis(cyclopentylpropionate) and the 3,17-bis(phenylpropionate).

Example III

A solution of 0.5 g. of 1,4-dimethyl-6-dehydro-estrone in 20 cc. of anhydrous benzene was added under an atmosphere of nitrogen to a cooled solution of 0.5 g. of potassium metal in 25 cc. of t-butyl alcohol, which had been prepared under an atmosphere of nitrogen. The stream of nitrogen was then substituted by a stream of dried and purified acetylene and the operation was continued for 40 hours. The solution was poured into 100 cc. of dilute hydrochloric acid, the organic solvents were removed by steam distillation and after cooling the precipitate was collected. Crystallization from chloroform-methanol afforded 1,4-dimethyl-17α-ethinyl-6-dehydro-estradiol.

Conventional reaction of this compound with acid anhydrides or chlorides gave the corresponding 3-propionate, 3-benzoate, 3-cyclopentylpropionate and 3-phenylpropionate.

Esterification with acid anhydrides in benzene solution in the presence of p-toluenesulfonic acid gave the corresponding 3,17-dipropionate, 3,17-dibenzoate and 3,17-dibutyrate of 1,4-dimethyl-17α-ethinyl-6-dehydro-estradiol.

Example IV 0.5 g. of 1,4-dimethyl-6-dehydro-estrone in 25 cc. of ethyl acetate was stirred under an atmosphere of hydrogen, at atmospheric pressure and room temperature, in the presence of 100 mg. of a 10% palladium on charcoal catalyst which had been previously reduced in 10 cc. of ethyl acetate. After the equivalent of 1 mol of hydrogen has been absorbed, the solution was filtered and evaporated to dryness. Crystallization from acetone-hexane yielded 1,4-dimethyl-estrone.

Conventional reaction of this compound with acid anhydrides or chlorides gave the corresponding 3-propionate, 3-benzoate, 3-cyclopentylpropionate and 3 - phenylpropionate.

Example V 0.3 g. of 1,4-dimethyl-estrone in 20 cc. of methanol was treated with a solution of 0.2 g. of sodium borohydride in 3 cc. of water. After 3 hours at room temperature the mixture was treated with a few drops of acetic acid and diluted with salt water. The precipitate was filtered, washed with water and crystallized from acetone-hexane giving 1,4-dimethyl-estradiol.

Conventional esterification of this compound with acid anhydrides or acid chlorides gave the corresponding 3,17-dipropionate, 3,17 - dibenzoate, 3,17 - bis(cyclopentylpropionate) and 3,17-bis(phenylpropionate).

Example VI

A solution of 0.5 g. of 1,4-dimethyl-estrone in 20 cc. of anhydrous benzene was added under an atmosphere of nitrogen to a cooled solution of 0.5 g. of potassium metal in 25 cc. of anhydrous t-butyl alcohol which had also been prepared under an atmosphere of nitrogen. The stream of nitrogen was then substituted by a stream of dried and purified acetylene and the operation was continued for 40 hours. The solution was poured into 100 cc. of dilute hydrochloric acid, the organic solvents were removed by steam distillation and the precipitate was filtered from the cooled mixture. Crystallization from chloroform-methanol produced 1,4-dimethyl-17α-ethinyl-estradiol.

Conventional reaction of this compound with acid anhydrides or chloride gave the corresponding 3-propionate, 3-benzoate, 3-cyclopentylpropionate and the 3-phenylpropionate, while reaction with acid anhydrides in benzene solution in the presence of p-toluenesulfonic acid gave the corresponding 3,17 - dipropionate, 3,17 - dibutyrate and 3,17-dibenzoate.

Example VI

A solution of 2.0 g. of 4-methyl-$\Delta^{1,4,6}$-androstatriene-3,17-dione in 200 cc. of mineral oil was passed through a column packed with glass helices previously heated to 600°, and this temperature was maintained during the operation. The solution was diluted with hexane and passed through a chromatographic column with 300 g. of alumina. The column was well washed with hexane to completely remove the mineral oil and then it was eluted with ether. The crystalline fractions were combined and recrystallized from methanol to give 4-methyl-6-dehydro-estrone.

Conventional reaction of this compound with acid anhydrides or chlorides gave the corresponding 3-propionate, 3-benzoate, 3-cyclopentylpropionate and the 3-phenylpropionate.

Example VIII 0.3 g. of 4-methyl-6-dehydro-estrone, dissolved in 20 cc. of methanol, was treated with a solution of 0.2 g. of sodium borohydride in 3 cc. of water and kept for 3 hours at room temperature. A few drops of acetic acid was then added and the solution was diluted with salt water. The precipitate was collected, washed with water and crystallized from acetone-hexane, thus giving 4-methyl-6-dehydro-estradiol.

Conventional reaction of this compound with acid anhydride or chlorides gave the corresponding 3,17-dipropionate, 3,17-dibenzoate, 3,17-bis(cyclopentylpropionate) and the 3,17-bis(phenylpropionate).

Example IX

A solution of 0.5 g. of 4-methyl-6-dehydro-estrone in 20 cc. of anhydrous benzene was added under an atmosphere of nitrogen to a cooled solution of 0.5 g. of potassium metal in 25 cc. of t-butyl alcohol, which had also been prepared under a stream of nitrogen. The stream of nitrogen was then substituted by a stream of dry, purified acetylene and the operation was continued for 40 hours. The solution was poured into 100 cc. of dilute hydrochloric acid, the organic solvents were removed by steam distillation, the mixture was cooled and the precipitate was collected. Crystallization from chloroform-methanol yielded 4-methyl-17α-ethinyl-6-dehydro-estradiol.

Conventional reaction of this compound with acid anhydrides or chlorides gave the corresponding 3-propionate, 3-benzoate, 3-cyclopentylpropionate and 3-phenylpropionate.

Example X

A solution of 0.5 g. of 4-methyl-6-dehydro-estrone in 25 cc. of ethyl acetate was stirred under an atmosphere of hydrogen, at room temperature and atmospheric pressure, in the presence of 100 mg. of a 10% palladium on charcoal catalyst. After the equivalent of one mol of hydrogen had been absorbed, the solution was filtered and evaporated to dryness. Crystallization from acetone-hexane afforded 4-methyl-estrone.

Conventional reaction of this compound with acid anhydrides or chlorides gave the corresponding 3-propionate, 3-benzoate, 3-cyclopentylpropionate and the 3-phenylpropionate.

Example XI 0.3 g. of 4-methyl estrone dissolved in 20 cc. of methanol was treated with a solution of sodium borohydride, as described in Example II, thus affording 4-methyl-estradiol.

Conventional reaction of this compound with acid anhydrides or chlorides gave the corresponding 3,17-dipropionate, 3,17-dibenzoate, 3,17-bis(cyclopentylpropionate) and the 3,17-bis(phenylpropionate).

Example XII

The reaction of 4-methyl-estrone with potassium t-butylate and acetylene, in accordance with the conditions described in Example IX, produced 4-methyl-17α-ethinyl-estradiol.

Conventional reaction of this compound with acid anhydrides or chlorides gave the corresponding 3-propionate, 3-benzoate, 3-cyclopentylpropionate and the 3-phenylpropionate.

Example XIII

A solution of 500 mg. of the 3-propionate of 4-methyl-17α-ethinyl-estradiol in 30 cc. of benzene was treated with 1 g. of butyric anhydride and 200 mg. of p-toluenesulfonic acid; the mixture was kept at room temperature for 48 hours and the solvent was then evaporated; by chromatography of the residue on neutral alumina and recrystallization of the solid eluates from acetone-hexane, there was obtained the 3-propionate-17-butyrate of 4-methyl-17α-ethinyl-estradiol.

200 mg. of the above compound was treated with 10 cc. of methanolic potassium hydroxide solution and stirred for 2 hours at 10° C. The mixture was acidified with dilute hydrochloric acid, the product was extracted with ethyl acetate and the extract was washed with water, dried over anhydrous sodium sulfate and evaporated to dryness. Recrystallization of the residue from acetone-hexane furnished the 17-butyrate of 4-methyl-17α-ethinyl estradiol.

We claim:
1. 4-methyl-17α-ethinyl-6-dehydro-estradiol.
2. 1,4-dimethyl-17α-ethinyl-6-dehydro-estradiol.

References Cited in the file of this patent

UNITED STATES PATENTS

| | | |
|---|---|---|
| 2,671,092 | Djerassi et al. | Mar. 2, 1954 |
| 2,705,237 | Djerassi et al. | Mar. 29, 1955 |
| 2,723,280 | Inhoffen et al. | Nov. 8, 1955 |
| 2,844,602 | Ringold et al. | July 22, 1958 |

FOREIGN PATENTS

| | | |
|---|---|---|
| 723,697 | Great Britain | Feb. 9, 1955 |